(12) United States Patent
Kliesch et al.

(10) Patent No.: US 8,277,710 B2
(45) Date of Patent: Oct. 2, 2012

(54) BIAXIALLY ORIENTED HYDROLYSIS-STABLE POLYESTER FILM COMPRISING EPOXIDIZED FATTY ACID DERIVATIVES, AND PROCESS FOR PRODUCTION THEREOF AND USE THEREOF

(75) Inventors: Holger Kliesch, Ginsheim (DE);
Dagmar Klein, Ockenheim (DE);
Rainer Kurz, Bad Schwalbach (DE);
Dirk Broeder, Schweppenhausen (DE);
Gottfried Hilkert, Saulheim (DE);
Volker Schaefer, Ludwigshafen (DE)

(73) Assignee: Mitsubishi Polyester Film GmbH, Wiesbaden (DE)

( * ) Notice: Subject to any disclaimer, the term of this patent is extended or adjusted under 35 U.S.C. 154(b) by 42 days.

(21) Appl. No.: 12/384,239

(22) Filed: Apr. 2, 2009

(65) Prior Publication Data
US 2010/0120946 A1   May 13, 2010

(30) Foreign Application Priority Data
Nov. 11, 2008   (DE) .......................... 10 2008 056 693

(51) Int. Cl.
*B29C 47/00*   (2006.01)
*C08L 63/00*   (2006.01)
*C08G 63/60*   (2006.01)
*C08G 67/02*   (2006.01)
*C08G 59/00*   (2006.01)

(52) U.S. Cl. ...................... 264/210.6; 523/400; 524/605; 525/438

(58) Field of Classification Search ................... 523/400
See application file for complete search history.

(56) References Cited

U.S. PATENT DOCUMENTS

| 3,981,737 A | 9/1976 | Evilampi et al. |
| 5,885,709 A | 3/1999 | Wick et al. |
| 2006/0057409 A1* | 3/2006 | Kliesch et al. ................ 428/480 |
| 2007/0238816 A1* | 10/2007 | Kliesch et al. ................ 524/114 |

FOREIGN PATENT DOCUMENTS

| CH | 621 135 A5 | 1/1981 |
| DE | 103 49 168 A1 | 6/2005 |
| EP | 0 738 749 A1 | 10/1996 |
| EP | 0 861 299 B1 | 9/1997 |
| EP | 0 838 500 A2 | 4/1998 |
| EP | 1 634 914 A1 | 3/2006 |
| EP | 1 842 871 A1 | 10/2007 |
| FR | 2 812 299 A1 | 2/2002 |
| WO | WO 2004/069912 A1 | 9/2004 |

* cited by examiner

*Primary Examiner* — Peter F Godenschwager
*Assistant Examiner* — David Karst
(74) *Attorney, Agent, or Firm* — ProPat, L.L.C.

(57) ABSTRACT

The invention relates to biaxially oriented polyester films which contain 0.1-5.0% by weight (based on the weight of the film) of a hydrolysis stabilizer based on epoxidized fatty acid esters and 0.2-10% by weight (based on the weight of the film) of epoxidized fatty acid glycerides, the epoxidized fatty acid esters having a mean molecular weight of at least 425 g/mol. Such films find use in outdoor applications, as a ribbon cable, as a backside laminate of solar modules and in electrical insulation applications.

24 Claims, No Drawings

BIAXIALLY ORIENTED HYDROLYSIS-STABLE POLYESTER FILM COMPRISING EPOXIDIZED FATTY ACID DERIVATIVES, AND PROCESS FOR PRODUCTION THEREOF AND USE THEREOF

Biaxially oriented hydrolysis-stable polyester film comprising epoxidized fatty acid derivatives, and process for production thereof and use thereof

CROSS-REFERENCE TO RELATED APPLICATIONS

This application claims priority to German Patent Application 10 2008 056 693.4 filed Nov. 11, 2008 which is hereby incorporated herein by reference in its entirety.

FIELD OF THE INVENTION

The invention relates to a hydrolysis-resistant film composed of a polyester, whose thickness is within the range from 11 to 500 μm. The film comprises at least two different hydrolysis stabilizers and is notable for its low hydrolysis rate and a low gel formation tendency in production. The invention further relates to a process for producing the film and to the use thereof.

BACKGROUND OF THE INVENTION

Films composed of polyesters within the thickness range specified are sufficiently well known. However, a disadvantage of such polyester films is their hydrolysis tendency, especially at temperatures above the glass transition temperature of the particular polyester. In this context, the hydrolysis tendency is understood to mean the property of the polyester of being degraded hydrolytically under moist conditions, which is noticeable, for example, by a reduction in the IV or SV. This is a limiting factor for the use of polyester films especially in applications with relatively high thermal stress, such as in film capacitors, cable sheathing, ribbon cables, engine protection films, but also in long-term applications such as in glazing and outdoor applications, and especially in the backside laminate of solar modules.

The hydrolysis tendency is particularly marked in the case of aliphatic polyesters, but also in the case of aromatic polyesters such as PBT and PET. When the hydrolysis tendency of PET becomes too great for the application, it is necessary to revert to the more hydrolysis-stable PEN or even to other polymers, for example polyetherimides or polyimides. However, these are significantly more expensive than PET and are therefore frequently no solution for economic reasons.

It has therefore already been proposed to improve the hydrolysis stability of polyester films through the incorporation of hydrolysis stabilizers.

More hydrolysis-resistant polyester raw materials which are obtained through use of carbodiimides, and fibers and films produced therefrom, are known (U.S. Pat. No. 5,885, 709, EP-A-0 838 500, CH-A-621 135). Films which are produced from such raw materials, however, tend both in production and in later use to outgas isocyanates and other mucosa-irritant or harmful by-products and degradation products. This is a much greater problem in flat structures such as films with a large surface area than, for example, in injection moldings.

Polyester films with epoxidized vegetable oils as stabilizers are described in EP-A-1 634 914 and EP-A-1 842 871. The toxic degradation products which are typical of carbodiimides do not occur here, the incorporation into the polyester matrix is good given suitable selection of the oils, and there is good hydrolysis stabilization of the films. Disadvantages which occur in application are, however, recurring production intervals with an extreme tendency to gel formation in production. When the gel level becomes too high, this results in breakoffs, and production of the film becomes impossible for a time. Production then has to be stopped and the extrusion has to be cleaned.

Moreover, the fatty acid esters described there, owing to their quite low molecular weight, have a high vapor pressure under the polyester production conditions. This leads firstly to the outgassing thereof during production with corresponding odor nuisance and fatty acid ester condensates on production plant parts, and leads additionally to increased migration of these molecules out of the film, which can lead in downstream processing operations to adhesion problems in lamination, metallization, etc. During production, these compounds additionally get into the extruder vacuum (in the case of use of twin-screw/multiscrew extruders (and are thus no longer available in the film at all as a hydrolysis stabilizer.

SUMMARY OF ADVANTAGEOUS EMBODIMENTS OF THE INVENTION

It is an object of the present invention to provide a hydrolysis-stable polyester film which avoids the disadvantages of the prior art described. More particularly, a hydrolysis-stable film shall be provided, without gels occurring to a significant degree in the course of production. The film should be producible in an economically viable manner.

This object is achieved by a biaxially stretched polyester film which, as well as polyester, contains 0.1-5% by weight (based on the weight of the film) of a hydrolysis stabilizer based on epoxidized fatty acid esters and 0.2-10% by weight (based on the weight of the film) of epoxidized fatty acid glycerides. The epoxidized fatty acid esters have a mean molecular weight of at least 425 g/mol.

DETAILED DESCRIPTION OF ADVANTAGEOUS EMBODIMENTS OF THE INVENTION

The film comprises, as the main constituent, a polyester. Suitable polyesters are, for example, polyethylene terephthalate (PET), polyethylene naphthalate (PEN), polybutylene terephthalate (PBT), polytrimethylene terephthalate (PTT), bibenzoyl-modified polyethylene terephthalate (PETBB), bibenzoyl-modified polybutylene terephthalate (PBTBB), bibenzoyl-modified polyethylene naphthalate (PENBB) or mixtures thereof, preference being given to PET, PBT, PEN and PTT, and mixtures and copolyesters thereof.

To prepare the polyesters, in addition to the main monomers such as dimethyl terephthalate (DMT), ethylene glycol (EG), propylene glycol (PG), 1,4-butanediol, terephthalic acid (TA), benzenedicarboxylic acid and/or 2,6-naphthalenedicarboxylic acid (NDA), it is also possible to use isophthalic acid (IPA), trans- and/or cis-1,4-cyclohexanedimethanol (c-CHDM, t-CHDM or c/t-CHDM), neopentyl glycol and other suitable dicarboxylic acid components (or dicarboxylic esters) and diol components.

Preference is given to polyesters in which the dicarboxylic acid component consists of terephthalic acid (TA) to an extent of 90% by weight (based on the total amount of the dicarboxylic acid component) and more, especially to an extent of 95% by weight and more. Preference is further given to polyesters in which the diol component consists of ethylene glycol (EG) to an extent of 90% by weight and more, especially to an extent of 93% by weight (based on the total amount of the diols) and more. Preference is also given to polymers in which the diethylene glycol content (DEG) in the overall polymer is in the range from 0.25 to 3% by weight. Particular preference is given to a DEG content of 0.75-1.5% by weight, since the most stable running reliability is achieved within these limits, with simultaneously the best hydrolysis stability. In all amounts stated in this paragraph, the hydrolysis stabilizer is disregarded.

The film according to the invention may further comprise inorganic or organic particles which are required to adjust the surface topography or appearance (gloss, haze, etc.). Such particles are, for example, calcium carbonate, apatite, silicon dioxide, titanium dioxide, aluminum oxide, crosslinked polystyrene, crosslinked polymethyl methacrylate (PMMA), zeolites and other silicates such as aluminum silicates. These compounds are used generally in amounts of 0.05 to 5% by weight, preferably 0.1 to 0.6% by weight (based on the weight of the film). Particular preference is given to calcium carbonate and silicon dioxide.

To achieve good running reliability in production, the particle sizes $d_{50}$ used are generally between 0.1 and 20 µm and preferably between 0.3 and 7 µm and more preferably between 0.5 and 5 µm. Fibrous inorganic additives such as glass fibers are unsuitable since they make the production of the polyester film uneconomic as a result of many breakoffs.

All particle sizes stated are based on the $d_{50}$ value before the incorporation of the particles into the polymer.

In a preferred embodiment, the film is white. Suitable white pigments are especially titanium dioxide, barium sulfate, or incompatible polymers such as polypropylene, polyethylene or COC (the use of incompatible polymers is less preferred than the use of white pigments, since the thermal stability of such white films is less good than with inorganic white pigments), or combinations thereof. These are added to the polyester in an amount of 1-35% by weight, the preferred amount added being between 2 and 20% by weight (based on the total weight of the film). In this embodiment, the film more preferably contains between 3 and 10% by weight (based on the total weight of the film) of white pigment. To achieve good running reliability and whiteness, the particle sizes $d_{50}$ used are generally between 0.05 and 5 µm and preferably between 0.1 and 1 µm (applies only to inorganic white pigments). The preferred white pigment is $TiO_2$, since this allows better weathering stabilities to be achieved. The titanium dioxide is preferably modified and/or coated with other element oxides. Preferred elements are Al, Si, V, P and Ca, and combinations thereof. Such pigments are described, for example, in U.S. Pat. No. 3,981,737 or EP0861299. White films have been found to be superior to clear films especially in outdoor applications. The reason for this also lies in the lesser damage to the stabilizers by light. It has therefore been found to be favorable when the films have a transparency (ASTM D1003) of <60%, preferably of <40%. In addition to the transparency in the visible region, it has been found to be favorable when the transparency in the UV-A at 370 nm is <20% and preferably <10% and ideally less than 5%.

In addition to the additives mentioned, the film may additionally comprise further components such as flame retardants (preferably organic phosphoric esters) and/or free-radical scavengers/antioxidants and/or UV stabilizers and/or chain extenders. A selection of suitable antioxidants and UV stabilizers can be found in FR2812299.

In addition to the inventive polyesters, the pigments (or less preferably, incompatible polymers as the white pigment), the hydrolysis stabilizers and further additives mentioned in the preceding paragraph, the film contains typically less than 5% by weight, more preferably less than 1% by weight and ideally no further additives at all, more particularly no further polymers since these generally worsen the mechanical properties in stretched films.

The inventive film contains a mixture of at least two hydrolysis stabilizers. One is selected from the group of the epoxidized fatty acid glycerides. The proportion of this component is between 0.2 and 10% by weight (based on the weight of the film), preferably 1.0-7% by weight and more preferably 2.5-6% by weight. The second is selected from the group of the epoxidized fatty acid esters. The proportion of this component is between 0.1 and 5% by weight (based on the weight of the film), preferably 0.2-3% by weight and more preferably 0.3-1.5% by weight.

Suitable epoxidized fatty acid glycerides are mixtures of glyceryl esters or pure glyceryl esters, the glyceryl esters preferably being described by the following formula:

  Formula 1:

where R1 and R2 and R3 may be either the same or different. $R_1$, $R_2$ and $R_3$ preferably follow the following formula:

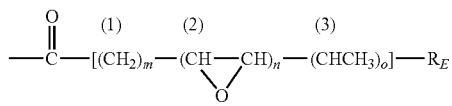

where $R_E$=$CH_3$ or H and
m=1-40, preferably 7-20, more preferably 10-16
n=0-10, preferably 1-4, more preferably 2-3
o=0-4, preferably 0.

On average, m is typically in the range from 9 to 16 and more preferably in the range from 11 to 13. n on average is typically in the range from 1 to 3 and more preferably from 1.5 to 2.75 and ideally from 2 to 2.5. o is typically <0.5 on average.

The sequence of the individual methylene ($CH_2$)— (1), epoxy (CHOCH)— (2) and ($CHCH_3$)— (3) groups is as desired, though typically at least 2 methylene groups (1) and more preferably 7 methylene groups (1) follow on from the carbonyl group, before being followed by one or more of the (2) or (3) groups and then again preferably by at least one methylene group (1).

$R_{1,2,3}$ radicals where m=0 are present in glyceryl ester mixtures to an extent of less than 30 and preferably to an extent of less than 20% by weight, and more preferably to an extent of less than 10% by weight (based on the total weight of the glyceryl esters).

One or more of the $R_1$ and $R_2$ and $R_3$ radicals may each independently also be defined as follows:

$R_{1,2,3}$=H
$R_{1,2,3}$=unsaturated (double bond-containing or not completely epoxidized) C8-C40 fatty acid
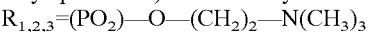
$R_{1,2,3}$=other organic radical not definable in detail (since usually of biogenic origin);

though such glyceryl esters are less preferred, and glyceryl esters which contain these radicals are present in glyceryl ester mixtures preferably to an extent of less than 20 and more preferably to an extent of less than 5% by weight; this means that the aforementioned preferred glyceryl esters are present in glyceryl ester mixtures typically to an extent of more than 80 and more preferably to an extent of more than 95% by weight.

Since the glyceryl esters used are preferably epoxidized oils of biogenic origin, these comprise, as well as the glyceryl esters, usually also small amounts of other substances (proteins, etc.). The proportion of these substances is typically less than 10% by weight and preferably less than 2% by weight, based on the total weight of the hydrolysis stabilizers.

More particularly, the proportion of compounds having a boiling point below 210° C. is typically less than 5% by weight and preferably less than 1% by weight, based on the total weight of the hydrolysis stabilizers.

Suitable epoxidized fatty acid esters or mixtures of epoxidized fatty acid esters can be described by the following formula:

$$R_4OR_5 \quad \text{Formula 2:}$$

where $R_4$ is preferably described by the following formula:

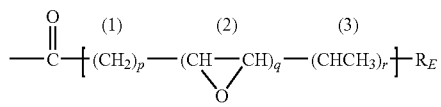

where $R_E=CH_3$ or H and
p=1-40, preferably 7-20, more preferably 10-16
q=0-10, preferably 1-4, more preferably 2-3
r=0-4, preferably 0.

On average, p is typically in the range from 9 to 16 and preferably in the range from 11 to 13. q on average is typically in the range from 1 to 3 and preferably in the range from 1.2 to 2.5.

r is preferably <0.5 on average.

The sequence of the individual methylene $(CH_2)$— (1), epoxy (CHOCH)— (2) and $(CHCH_3)$— (3) groups is as desired, though typically at least 2 methylene groups (1) and more preferably 7 methylene groups (1) follow on from the carbonyl group, before being followed by one or more of the (2) or (3) groups and then preferably again at least once by (1).

The $R_5$ radical is preferably described by the following formula:

$$-(CH_2)_s-R_6 \quad \text{Formula 3:}$$

where s=0-50, preferably 1-20 and more preferably 1-8;
$R_6$ is preferably
H or
$C_tH_{(2t+1)}$ where t=3-10, preferably 5-8,
more preferably
—$CH(CH_2-CH_3)-(CH_2)_3-CH_3$.

Such compounds are sold, for example, by Arkema USA under the name Vikoflex 9080.

Preferably,
$R_6=O-((CH_2)_u-O)_v-Y$, where
u is preferably 2-5 and
v is preferably 2-5000 and
Y is H or $CH_3$.

More preferably,
$R_6=O-R_4$ where $R_4$ corresponds to the $R_4$ radical from formula 2.

Such compounds are sold, for example, by Arkema USA under the name VIKOFLEX® 5075 and are referred to hereinafter as fatty acid diesters.

$R_6$ may also be —OH, but this embodiment is less preferred.

The epoxidized fatty acid esters contain typically less than 10% and preferably less than 5% by weight (based on the total weight of the fatty acid esters used) of further compounds not described by formula 2; this means that the aforementioned epoxidized fatty acid esters are present in mixtures of such esters typically to an extent of more than 90 and more preferably to an extent of more than 95% by weight.

The acid number of the hydrolysis stabilizers used is typically less than 10 and preferably less than 2 mg KOH per gram (DIN EN ISO 3682). The higher the acid number, the higher is the gel formation tendency.

For the incorporation and for the effectiveness of the hydrolysis stabilizer action, it has been found to be favorable when the viscosity of the stabilizers used is greater than 300 mPa s, preferably greater than 500 mPa s and more preferably greater than 700 mPa s at 25° C. (DIN 53018). The lower the viscosity, the higher the risk of viscosity drops in the extrusion, which can lead to breakoffs.

Suitable epoxidized fatty acid glycerides are, for example, epoxidized soybean oil, epoxidized linseed oil, epoxidized colza oil, epoxidized sunflower oil and epoxidized fish oil (the composition of the oils mentioned, especially the type and amount of the fatty acids present, is described, for example, in Römpp Chemie Lexikon, 10th edition, Georg Thieme Verlag, Stuttgart). Particular preference is given to using epoxidized linseed oil. The epoxidized fatty acid esters can be obtained from the abovementioned oils by reaction with the corresponding alcohols (or suitable alcohol derivatives). The reaction with diols forms the particularly preferred fatty acid diesters.

The hydrolysis stabilizers tend to lower the mechanical stability and elongation at break of the biaxially stretched polyester films. They additionally tend to lead to a lower dielectric strength in the preferred electrical insulation applications and worsen the performance of the film in lamination operations, as a result of lower adhesion of the adhesive systems typically used. Therefore, the sum of the two hydrolysis stabilizers should appropriately be <10% by weight, preferably <7% by weight and more preferably <5% by weight (based on the total weight of the film). The sum of the two chain extenders is typically at least 1% by weight and preferably at least 2% by weight, in order that effective hydrolysis stabilization and homogeneous mixing into the polymer matrix are ensured.

The proportion of the fatty acid glycerides described by formula 1 in the total hydrolysis stabilizer content is typically >40% by weight. A particularly favorable proportion is >66% by weight and a most favorable proportion is >80% by weight. The proportion of the fatty acid esters described by formula 2 in the total hydrolysis stabilizer content is appropriately >5% by weight and preferably >10% by weight and more preferably >15% by weight.

These ratios are advantageous since it has been found that the hydrolysis-stabilizing action of the fatty acid glycerides is several times greater than that of the corresponding fatty acid esters. The fatty acid esters stop gelation, but make a smaller contribution to the hydrolysis stabilization themselves.

It has been found that the effect of the fatty acid esters as hydrolysis stabilizers is less when the mean number of epoxy groups per molecule is significantly less than 2. In a preferred embodiment, the mean number of epoxy groups is therefore greater than 1.5, more preferably greater than 1.6 and most preferably >1.7. The mean number of epoxy groups is a mean and is not an integer because the fatty acid esters are generally also obtained from natural oils which consist of a mixture of different fatty acids. Only in the case of a high proportion of polyunsaturated fatty acids in the starting oil is it possible to obtain, from these fatty acid esters, which achieve the above-described mean epoxy group contents, or in the case of use of fatty acid diesters. It has been found that, surprisingly, neither fatty acid esters with a high mean number of epoxy groups (>1.7 per molecule) nor the fatty acid diesters themselves contribute to gelation.

However, the fatty acid esters frequently have one disadvantage, specifically a lower molecular weight than the fatty acid glycerides. In the case of use of multiscrew extruders, which are convenient in terms of process technology and all of which work with degassing steps, this leads to introduction of these compounds into the extruder vacuum, with the risk of possible damage there. In particular, it leads to the effect that the fractions drawn off are neither available as a hyrolysis stabilizer in the polyester nor can stop gelation by the fatty acid glycerides used. The proportion not drawn off in the melt degassing step then tends—later in the production process—to outgas at the die and in the setting frame with undesired introduction into the ambient air and precipitation on relatively cool machine parts. This disadvantage is avoided when the mean molecular weight of the epoxidized fatty acid esters used in accordance with the invention is greater than/equal to 425 g/mol. Particularly good results are achieved when the molecular weight is greater/equal to 450 g/mol and the best results when the molecular weight is more than 550 g/mol. When the ester is a pure (content >95% by weight) epoxidized ester, these limits are based on the nominal substance used. When the esters are epoxidized esters from natural sources which have not been isolated specifically, the molecular weight (of such epoxidized fatty acid ester mixtures) is not always easy to determine. The fatty acid composition of the starting oil is then determined and, subsequently, complete reaction with the alcohol(s) selected for fatty acid ester formation and full epoxidation are assumed (for the determination of the percentage fatty acid composition, method 3.7 in chapter 7 of the Schweizerisches Lebensmittelbuch [Swiss Foods Handbook, July 2000 edition]; in this method, alkaline transmethylation of the fatty acid esters in the food forms the fatty acid methyl esters (FAME), which are then determined by means of GC/FID). It is thus possible to calculate the mean molecular weights. When the starting oil is unknown, the epoxidized oil has to be separated by means of GC or liquid chromatography, the individual components determined by means of mass spectroscopy and the mean molecular weight thus determined. The preferred fatty acid diesters possess particularly low volatilities.

In addition, it has been found to be favorable when a stabilizer in the form of a free-radical scavenger is added to the film, since this counteracts the loss of active oxirane groups in the extrusion as a result of free-radical side reactions. Appropriately, the inventive film contains such stabilizers as free-radical scavengers or thermal stabilizers in amounts of 50 to 15000 ppm, preferably 100 to 5000 ppm, more preferably 300 to 1000 ppm, based on the weight of the film. The stabilizers added to the polyester raw material are selected as desired from the group of the primary stabilizers, such as sterically hindered phenols or secondary aromatic amines, or the group of the secondary stabilizers such as thioethers, phosphites and phosphonites, and also zinc dibutyldithiocarbamate, or synergistic mixtures of primary and secondary stabilizers. Preference is given to the phenolic stabilizers. The phenolic stabilizers include especially sterically hindered phenols, thiobisphenols, alkylidenebisphenols, alkylphenols, hydroxybenzyl compounds, acylaminophenols and hydroxyphenyl propionates (corresponding compounds are described, for example, in "Kunststoffadditive" [Plastics Additives], 2nd edition, Gächter Müller, Carl Hanser-Verlag, and in "Plastics Additives Handbook", 5th edition, Dr. Hans Zweifel, Carl Hanser-Verlag). Particular preference is given to the stabilizers with the following CAS numbers: 6683-19-8, 36443-68-2, 35074-77-2, 65140-91-2, 23128-74-7, 41484-35-9, 2082-79-3, and also IRGANOX® 1222 from Ciba Specialities, Basle, Switzerland, preference being given in particular embodiments to the IRGANOX® 1010, IRGANOX® 1222, IRGANOX® 1330 and IRGANOX® 1425 types or mixtures thereof.

Surprisingly, it has been found to be more favorable when the free-radical scavenger is not added to the hydrolysis stabilizer but to the polyester raw material as early as in the course of polymer preparation.

The hydrolysis stabilizers are preferably metered directly into the extruder in the course of film production. Preference is given to using multiscrew extruders (at least 2 screws).

The hydrolysis stabilizers can also be introduced by means of masterbatch technology. In other words, the hydrolysis stabilizer is introduced into the polymer in an extruder (preferably a multiscrew extruder). This polymer is/these polymers are then extruded again in pure form in the film production, or mixed with other polymers. However, this process is less preferred since hydrolysis stabilizer is consumed (depleted) as early as in the first extrusion step, and is then no longer available as an active substance in the film.

The film according to the invention is generally produced by extrusion processes known per se and has one or more layers, in which case the hydrolysis stabilizer may be present in all layers, though embodiments in which not all layers are modified with the hydrolysis stabilizer are also possible.

The film thickness is preferably between 11 and 500 μm and more preferably between 24 and 300 μm. In multilayer embodiments, the sum of the thicknesses of the hydrolysis stabilizer-containing layers is typically greater than 10 μm and less than 500 μm and more preferably >40 μm and less than 300 μm. In the case of very thick layers, irregularities in viscosity if anything occur in production. Total layer thicknesses of the hydrolysis stabilizer-containing layers below the preferred range are generally insufficient in outdoor applications (when only one such film layer is used) to stabilize the entire film sufficiently over the expected use period.

In a preferred embodiment, the film comprises, at least on one side, preferably on both sides, a top layer which does not contain any hydrolysis stabilizer. These layers are preferably configured as thin as possible in order to impair the hydrolysis stability of the overall film as little as possible. In other words, these layers are preferably each thinner than 5 μm, and more preferably thinner than 3 μm and ideally thinner than 0.8 μm. However, it has been found to be favorable when the layer is not thinner than 0.1 μm (below 0.1 μm, there is no longer a sufficient barrier to the migration of the hydrolysis stabilizers.

The hydrolysis stabilizer-free layers may in principle contain the same polymers and additives (with the exception of the hydrolysis stabilizers described) as the layer(s) which contain(s) the hydrolysis stabilizer. However, it has been found to be favorable when the polyester raw material of the hydrolysis stabilizer-free layers has a minimum content of carboxyl end groups. Such raw materials are described, inter alia, in EP-A-0 738 749. In a preferred embodiment, the carboxyl content expressed in mmolH$^+$/kg of polymer (weighted mean of all polymers used) is less than 25 and more preferably less than 15 and ideally <8 mmolH$^+$/kg of polymer. Such values can be achieved, for example, by solid-state condensation, or by end-capping. The viscosity of the raw materials used is typically between an IV of 0.61 and 0.75 (IV measured in trichloroethane/phenol as described in U.S. Pat. No. 3,432,591). Higher IV values, as described, for example, in EP-A-0 738 749, have been found to be unfavorable if anything in practice, since the high viscosities in the extruder require higher temperatures or higher shear rates, and the hydrolysis tendency of the melt thus increases. The IV values of the raw materials used in the layer(s) with hydrolysis stabilizer should likewise preferably be 0.61-0.75. More particularly, it has been found to be favorable when the difference between the IV values of the stabilizer-containing layer (in the case of layers, the mean) and the IV values of the layer without hydrolysis stabilizer (in the case of layers, the mean) is not greater than 0.1 and preferably not greater than 0.03. The preferred embodiment with at least one hydrolysis stabilizer-free top layer leads, in production, to a lower level of odor nuisance as a result of the fatty acid epoxides used and is better metallizable and laminatable (i.e. metals and adhesives adhere better to this layer).

In the process for producing the inventive films, the procedure is appropriately to extrude the corresponding melts through a flat die, to consolidate the film thus obtained by drawing it off and quenching it on one or more roll(s) (chill rolls) as a substantially amorphous preliminary film, then to reheat and biaxially stretch (orient) the film and heatset the biaxially stretched film. In the extrusion area, it has been found to be favorable when temperatures of 295° C. are not exceeded. It is particularly favorable when the region of the die and especially the region of the die lip and the vicinity thereof are not hotter than 290° C., preferably not hotter than 285° C. and more preferably not hotter than 275° C. The higher the temperature, the higher the thermal stress on the stabilizers and the higher the tendency to form gel. A higher temperature at this point additionally increases the amount of hydrolysis stabilizers which escapes.

The biaxial stretching is generally performed sequentially. This preferably involves stretching first in longitudinal direction (i.e. in machine direction, =MD) and then in transverse direction (i.e. at right angles to machine direction, TD). This leads to an alignment of the molecule chains. Stretching in longitudinal direction can be performed with the aid of two rolls running at different speeds according to the stretching ratio desired. For transverse stretching, an appropriate tenter frame is generally used.

The temperature at which the stretching is performed may vary within a relatively wide range and is guided by the desired properties of the film. In general, the longitudinal stretching and also the transverse stretching are performed at $T_g+10°$ C. to $T_g+60°$ C. ($T_g$=glass transition temperature of the film). The longitudinal stretching ratio is generally in the range from 2.0:1 to 6.0:1, preferably 3.0:1 to 4.5:1. The transverse stretching ratio is generally within a range from 2.0:1 to 5.0:1, preferably 3.0:1 to 4.5:1, and any second longitudinal and transverse stretching performed is at 1.1:1 to 5.0:1.

The longitudinal stretching can optionally be performed simultaneously with the transverse stretching (simultaneous stretching). It has been found to be particularly favorable when the stretching ratio in longitudinal and transverse direction is in each case greater than 3.0.

In the course of the subsequent heatsetting, the film is kept at a temperature of 150 to 260° C., preferably 200 to 245° C., for about 0.1 to 10 s. Subsequently to, or commencing within, the heatsetting, the film is relaxed by 0 to 15%, preferably by 1.5 to 8%, in transverse direction and optionally also in longitudinal direction, and then the film is cooled and wound in a customary manner.

A film produced in this way has a significantly lower hydrolysis tendency both at room temperature and at temperatures up to 210° C. than an unmodified polyester film. Compared to the films described in EP-A-1 634 914 with epoxidized fatty acid esters and fatty acid glycerides, in which the fatty acid esters used do not meet the conditions specified here, it was possible to significantly enhance productivity, since there were fewer breakoffs owing to gelation.

The stabilization is substantially independent of the film thickness and the temperature within a measurement range from 25 to 210° C.

The inventive films still have an SV of more than $600_{(SW1)}$ after 96 h in an autoclave with steam saturation at 110° C. and are thus still mechanically stable, whereas an unstabilized film after this time has already fallen below SV 400 and therefore has as good as no flexural breaking strength any longer. The stabilized film survives under the conditions mentioned for 300% longer before it attains the critical limit of 400 SV units. The same relative prolonged lifetime is also found at 80° C. and at 170° C.

Films stabilized by means of the hydrolysis stabilizers mentioned are outstandingly suitable for production of products which contain polyester films and are either designed for a long lifetime (greater than 1 year) or which are confronted during use by higher temperatures (greater than 80° C.), especially at high humidity (>50% rel. humidity) and for outdoor applications.

A further application is, for example, ribbon cables in automobiles. For this purpose, films (preferably 12-200 um) are laminated with copper by means of a heatsealing adhesive (e.g. EKP-HEIβSIEGELLACK® 230 from EKP Verpackungslacke GmbH (Germany)). Composites which comprise polyesters with hydrolysis stabilizers withstand the mechanical stresses (including vibrations) which occur in automobiles for much longer than composites comprising conventional polyester films. However, it should be ensured here that the adhesives are also substantially hydrolysis-insensitive (in polyester-based adhesives, modification with the hydrolysis stabilizers mentioned is advisable).

A further preferred application is use in the backside laminate of solar modules. It has been found to be favorable here when the shrinkage of the film (at 150° C., 30 min) in MD is <1.5% and in TD is <1.2%. Since the stabilizers used tend to lead to an increase in the shrinkage values, it has been found to be favorable when the sum of the percentages by weight of hydrolysis stabilizers is within the preferred ranges, and/or when the maximum setting temperature is >225° C. and the film is relaxed by more than 4% in transverse direction. The thickness of films used in solar modules is typically >25 μm and more preferably >45 μm.

In a preferred embodiment for electrical insulation applications (for example cables and backside laminates of solar modules), the film has a modulus of elasticity in both directions of greater than 3000 N/mm² and more preferably a modulus of elasticity of greater than 4000 N/mm² and ideally greater than 4500 N/mm² in both directions. This has the advantage of better electrical insulating action compared to materials with a lower level of orientation. These values are achieved, for example, when the sum of the percentages by weight of the hydrolysis stabilizers is within the preferred ranges. Particularly good mechanical properties are achieved when the proportion of the fatty acid glycerides is >80% by weight based on the total hydrolysis stabilizer content. More particularly, it is possible to achieve the strength values when the stretching ratio in both directions is greater than 3.1 or better greater than 3.3.

In a preferred embodiment for electrical insulation applications (for example cables and backside laminates of solar modules), the film has a density of greater than 1.1, more preferably of greater than 1.3 and ideally of greater than 1.4 g/cm³. Like the high mechanical strength, this improves the electrical insulating action. This can be achieved, for example, by virtue of the sum of the percentages by weight of hydrolysis stabilizers being within the preferred ranges and/or when the maximum setting temperature is at least 200° C.

In the working examples which follow, the individual properties are measured according to the standards and methods listed.

Test Methods

Standard Viscosity (SV)

The standard viscosity SV is—based on DIN 53726—measured by the measurement of the relative viscosity $\eta_{rel}$ of a 1% by weight solution in dichloroacetic acid (DCE) in an Ubbelohde viscometer at 25° C. The SV is defined as follows:

$$SV=(\eta_{rel}-1)\cdot 1000$$

Shrinkage

Thermal shrinkage is determined on square film specimens with an edge length of 10 cm. The samples are cut out such that one edge runs parallel to machine direction and one edge at right angles to machine direction. The samples are measured accurately (the edge length $L_0$ is determined for each machine direction TD and MD, $L_{0\ TD}$ and $L_{0\ MD}$) and heat treated in a forced-air drying cabinet at the given shrinkage temperature (here, 200° C.) for 15 min. The samples are removed and measured accurately at room temperature (edge length $L_{TD}$ and $L_{MD}$). The shrinkage is calculated from the equation $$\text{Shrinkage [\%] } MD=100\cdot(L_{0\ MD}-L_{MD})/L_{0\ MD}$$

$$\text{Shrinkage [\%] } TD=100\cdot(L_{0\ TD}-L_{TD})/L_{0\ TD}$$

Measurement of transparency

The measurement is effected on a HAZE-GARD PLUS® from BYK Gardner Instruments to ASTM D 1003.

Measurement of transparency at 370 nm

The transparency is measured with a LAMBDA® 3 UV/Vis spectrometer from Perkin Elmer.

Measurement of Density

Density can be determined in a gradient column (e.g. carbon tetrachloride and hexane) or by means of a gas pycnometer (helium or nitrogen).

Measurement of mean particle diameter $d_{50}$ on particles before introduction into the raw material The determination of the mean particle diameter $d_{50}$ was carried out by means of a laser on a MASTER SIZER® (Malvern Instruments, UK) by the standard method (other measuring instruments are, for example, Horiba LA ® 500 (Horiba Ltd., Japan) or HELOS® (Sympatec GmbH, Germany), which use the same measurement principle). To this end, the samples were placed into a cuvette with water which was then placed into the measuring instrument. The measuring operation is automatic and also includes the mathematical determination of the $d_{50}$. By definition, the $d_{50}$ is determined from the (relative) cumulative curve of the particle size distribution: the point of intersection of the 50% ordinate value with the cumulative curve provides the desired $d_{50}$ value on the abscissa axis.

Measurement of the Mechanical Properties of the Film

The mechanical properties are determined to DIN EN ISO 527-1 to 3.

Autoclaving

The films (10×2 cm) are hung in the autoclave (Adolf Wolf SANOKLAV® ST-MCS-204) on a wire and the autoclave is filled with 2 l of water. After the autoclave has been closed, it is heated. At 100 ° C., the air is displaced through the outlet valve by the water vapor. This is closed after approx. 5 min, and then the temperature rises to 110 ° C. and the pressure to 1.2-1.5 bar. After the time set, the autoclave is switched off automatically and, after opening the outlet valve, the films are removed. The SV is then determined thereon.

EXAMPLES

Hydrolysis Stabilizer 1 (HStab 1)

Epoxidized linseed oil with an epoxy oxygen content of 8.9% from Arkema USA. Linseed oil corresponds to formula 1 with the variables within the orders of magnitude specified there.

Hydrolysis stabilizer 2 (HStab 2)

Epoxidized propylene glycol dioleate (main component), epoxy oxygen content of 4.6%, from Arkema USA (VIKOFLEX® 5075). The mean molecular weight was determined to be 605; the mean number of epoxy groups per molecule was 1.85. HStab2 corresponds to formula 2 with the variables within the orders of magnitude specified there.

Hydrolysis Stabilizer 3 (HStab 3)

2-Hexylethyl ester of the epoxidized olive oil fatty acids with a proportion of epoxystearic acid (epoxidized oleic acid) of 61% by weight with an epoxy oxygen content of 5.3% by weight. The mean molecular weight was 415; the mean number of epoxy groups per molecule was 1.38. HStab3 corresponds to formula 2 with the variables within the orders of magnitude specified there, but the molecular weight is outside the inventive range.

Further Raw Materials Used

| Raw material R1 | PET (Invista Deutschland), SV 790 and a carboxyl end group content of 22 mmol/kg and a diethylene glycol content of 0.75% by weight |
|---|---|
| Masterbatch MB1 | 20% by weight of TiO$_2$ (HOMBITAN ® LW-SU from Sachtleben Deutschland) and 80% by weight of PET; SV 790; DEG content of 1% by weight and a carboxyl end group content of 42 mmol/kg (addition of TiO$_2$ by incorporation in a twin-screw extruder). |

Film Production:

Thermoplastic chips (MB1 and R1) were mixed in the ratios specified in the examples and extruded at 278° C. in a twin-screw extruder (JapanSteelWorks). The hydrolysis stabilizers were metered directly into the extruder intake by means of a pump. The molten polymer was drawn off by means of a draw roller from a nozzle. The film was stretched at 116° C. in machine direction by a factor of 3.4, and a transverse stretching by a factor of 3.3 was conducted in a frame at 110° C. Subsequently, the film was heatset at 225° C. and relaxed in transverse direction by 6% at temperatures of 200 to 180° C. The final film thickness was 50 µm.

The properties of the films produced can be found in the table which follows:

TABLE

|  |  | Example 1 | Comparative example 1 | Comparative example 2 |
|---|---|---|---|---|
| R1 | in % by wt. | 60.6 | 60.6 | 61 |
| MB1 | in % by wt. | 36 | 36 | 36 |
| Hystab 1 | in % by wt. | 3.0 | 2.55 | 3.0 |
| Hystab 2 | in % by wt. | 0.4 | 0 | 0 |
| Hystab 3 | in % by wt. |  | 0.85 | 0.0 |
| Film thickness | in μm | 50 | 50 | 50 |
| SV (after film production) |  | 770 | 762 | 772 |
| SV after 96 h at 110° C. in an autoclave with water saturation |  | 657 | 602 | 652 |
| Modulus of elasticity MD/TD | in N/mm$^2$ | 4910/4790 | 4870/4730 | 4920/4820 |
| Shrinkage in MD/TD | in % | 0.8/0.0 | 0.8/0.0 | 0.8/−0.1 |
| Density | in g/cm$^3$ | 1.417 | 1.419 | 1.421 |
| Transparency to ASTM D1003/transparency at 370 nm | in % | 28/0.5 | 29/0.5 | 29.5/0.5 |
| Viscosity drops during production in extrusion causing breakoff | Production time 24 h | 6 | 6 | 5 |
| Hydrolysis stabilizer in the cold trap of the extruder vacuum in % of the hydrolysis stabilizer used in the production time | % | 2 | 16 | 1 |
| Number of occurrences where production had to be stopped for several hours owing to too high a gel level | X per day | 0 | 0.4 | 1 (continuous industrial production difficult) |

The invention claimed is:

1. A biaxially oriented polyester film comprising 0.1-5.0% by weight based on the weight of the film, of a hydrolysis stabilizer based on epoxidized fatty acid esters and 0.2-10% by weight, based on the weight of the film, of epoxidized fatty acid glycerides, said epoxidized fatty acid esters having a mean molecular weight of at least 425 g/mol, wherein more than 90% by weight of the epoxidized fatty acid esters are esters of the formula 2:

 formula 2:

where $R_4$ is defined as follows:

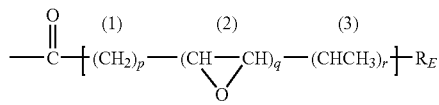

where $R_E = CH_3$ or H and
p = 1-40
q = 0-10
r 0-4
and the individual methylene (CH$_2$)— (1), epoxy (CHOCH)— (2) and (CHCH$_3$)— (3) groups may be present in any sequence and where
the $R_5$ radical is described by the following formula 3:

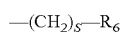 formula 3:

where s = 0-50
$R_6 = O—((CH_2)_u—O)_v—Y$ where u = 2-5, v = 2-5000 and Y = H or CH$_3$ or O—$R_4$, where $R_4$ corresponds to the $R_4$ radical from formula 2.

2. A biaxially oriented polyester film as claimed in claim 1 comprising 0.1-5.0% by weight, based on the weight of the film, of a hydrolysis stabilizer based on epoxidized fatty acid esters and 0.2-10% by weight, based on the weight of the film, of epoxidized fatty acid glycerides, said epoxidized fatty acid esters having a mean molecular weight of at least 425 g/mol, wherein said film still has a standard viscosity based on DIN 53726 of more than 600 after 96 hours in an autoclave with steam saturation at 110° C.

3. The polyester film as claimed in claim 1, wherein said film is white.

4. The polyester film as claimed in claim 1, wherein said film comprises one or more additives selected from the group consisting of: inorganic particles, organic particles, flame retardants, free-radical scavengers, antioxidants and UV stabilizers.

5. The polyester film as claimed in claim 4, wherein said film additionally comprises less than 5% by weight of further polymers.

6. The polyester film as claimed in claim 1, wherein more than 80% by weight of the epoxidized fatty acid glycerides used are glyceryl esters of the formula 1

 formula 1:

where the $R_1$, $R_2$ and $R_3$ radicals are each independently defined as follows:

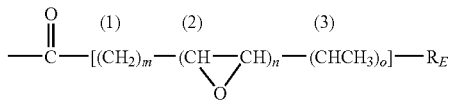

where $R_E = CH_3$ or H and
m = 1-40
n = 0-10
o = 4
and the individual methylene (CH$_2$)— (1), epoxy (CHOCH)— (2) and (CHCH$_3$)— (3) groups may be present in any sequence,
and where $R_{1,2,3}$ radicals where m=0 are present in glyceryl ester mixtures to an extent of less than 30% by weights, based on the total weight of the glyceryl esters.

7. The polyester film as claimed in claim 6, wherein the fatty acid glycerides described by formula 1 are present in the overall hydrolysis stabilizer in an amount of greater than 40% by weight.

8. The polyester film as claimed in claim 1, wherein more than 90% by weight of the epoxidized fatty acid esters are esters of the formula 2:

R$_4$OR$_5$     formula 2:

where R$_4$ is defined as follows:

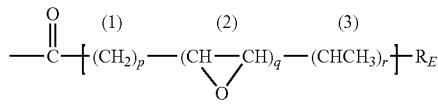

where R$_E$=CH$_3$ or H and
p=7-20
q=1-4
r=0.

9. The polyester film as claimed in claim 8, wherein the fatty acid esters described by formula 2 are present in the overall hydrolysis stabilizer in an amount of greater than 5% by weight.

10. The polyester film as claimed in claim 1, wherein the acid number of the hydrolysis stabilizers used is less than 10 mg KOH per gram, as determined pursuant to DIN EN ISO 3682.

11. The polyester film as claimed in claim 1, wherein the epoxidized fatty acid esters and epoxidized fatty acid glycerides are present in a total amount of less than 10% by weight, based on the weight of the film.

12. The polyester film as claimed in claim 1, wherein the epoxidized fatty acid esters and epoxidized fatty acid glycerides are present in a total amount of at least 1% by weight, based on the weight of the film.

13. The polyester film as claimed in claim 1, wherein the epoxidized fatty acid esters have a mean number of epoxy groups per fatty acid ester molecule of less than 2 and/or greater than 1.5.

14. The polyester film as claimed in claim 1, wherein the epoxidized fatty acid esters have a mean molecular weight of greater than 450 g/mol.

15. The polyester film as claimed in claim 1, wherein the epoxidized fatty acid glyceride is selected from one or more epoxidized oils from the group consisting of: epoxidized soybean oil, epoxidized linseed oil, epoxidized colza oil, epoxidized sunflower oil and epoxidized fish oil.

16. A process for producing a polyester film as claimed in claim 1, comprising
(i) extruding the melt compositions corresponding to the film through a flat die,
(ii) consolidating the film thus obtained by drawing the extruded melt off and quenching it on one or more chill rolls to form a substantially amorphous preliminary film,
(iii) orienting the substantially amorphous preliminary film by reheating and biaxially stretching the amorphous preliminary film and
(iv) heatsetting the biaxially stretched film and rolling the heatset film up,
wherein said film contains 0.1-5.0% by weights based on the weight of the film, of a hydrolysis stabilizer based on epoxidized fatty acid esters and 0.2-10% by weights, based on the weight of the film, of epoxidized fatty acid glycerides, said epoxidized fatty acid esters having a mean molecular weight of at least 425 g/mol.

17. Outdoor film, ribbon cable, backside laminate of solar modules or electrical insulation comprising film as claimed in claim 1.

18. A biaxially oriented polyester film as claimed in claim 1, wherein the total amount of the epoxidized fatty acid esters and the epoxidized fatty acid glycerides ranges from at least 1% to less than 10% by weight of the total weight of the film, and the resulting film has a modulus of elasticity in both directions of greater than 3000 N/mm$^2$.

19. A biaxially oriented polyester film as claimed in claim 18, wherein the total amount of the epoxidized fatty acid esters and the epoxidized fatty acid glycerides ranges from at least 1% to less than 7% by weight of the total weight of the film, the proportion of the fatty acid glycerides is greater than 40% by weight, based upon sum of the epoxidized fatty acid esters and the epoxidized fatty acid glycerides, the resulting film has a modulus of elasticity in both directions of greater than 4000 N/mm$^2$ and a density of greater than 1.3 g/cm$^3$.

20. A biaxially oriented polyester film as claimed in claim 1, wherein said film retains a higher amount of said epoxidized fatty acid ester in comparison to said film wherein the epoxidized fatty acid ester has a mean molecular weight of less than 425 g/mol.

21. A biaxially oriented polyester film as claimed in claim 1, wherein said film exhibits lower outgassing, lower gelation and improved hyrdrolytic stability in comparison to said film wherein the epoxidized fatty acid ester has a mean molecular weight of less than 425 g/mol.

22. A biaxially oriented polyester film as claimed in claim 1, wherein said hydrolysis stabilizer has a viscosity of greater than 300 mPa s at 25° C., per DIN 53018.

23. A biaxially oriented polyester film as claimed in claim 1, wherein said film takes 30% longer in an autoclave with steam saturation at 110° C. to reach 400 standard viscosity units than an unstabilized polyester film.

24. A biaxially oriented polyester film as claimed in claim 1, wherein R$_6$ =O—R$_4$ and said epoxidized fatty acid ester is a fatty acid diester.

* * * * *

UNITED STATES PATENT AND TRADEMARK OFFICE
CERTIFICATE OF CORRECTION

PATENT NO. : 8,277,710 B2  
APPLICATION NO. : 12/384239  
DATED : October 2, 2012  
INVENTOR(S) : Kliesch et al.

Page 1 of 1

It is certified that error appears in the above-identified patent and that said Letters Patent is hereby corrected as shown below:

Claims:
Column 14
Claim 6, Line 45, delete "used"
Claim 6, Line 66, delete "weights" insert --weight--

Column 16
Claim 16, Line 10, delete "weights" insert --weight--
Claim 16, Line 12, delete "weights" insert --weight--
Claim 23, Line 48, delete "30%" insert --300%--

Signed and Sealed this
Sixth Day of November, 2012

David J. Kappos
*Director of the United States Patent and Trademark Office*